(12) United States Patent
Dal Prà

(10) Patent No.: US 8,424,414 B2
(45) Date of Patent: Apr. 23, 2013

(54) CONTROL DEVICE FOR A BICYCLE DERAILLEUR

(75) Inventor: Giuseppe Dal Prà, Zané (IT)

(73) Assignee: Campagnolo S.r.l., Vicenza (IT)

( * ) Notice: Subject to any disclaimer, the term of this patent is extended or adjusted under 35 U.S.C. 154(b) by 613 days.

(21) Appl. No.: 11/475,621

(22) Filed: Jun. 27, 2006

(65) Prior Publication Data

US 2007/0137388 A1    Jun. 21, 2007

(30) Foreign Application Priority Data

Jun. 27, 2005  (EP) ..................................... 05425458

(51) Int. Cl.
*B62M 25/04* (2006.01)

(52) U.S. Cl.
USPC ........................................................ 74/502.2

(58) Field of Classification Search ............... 74/473.14, 74/473.15, 488, 489, 502.2
See application file for complete search history.

(56) References Cited

U.S. PATENT DOCUMENTS

| | | | |
|---|---|---|---|
| 1,706,542 A | 3/1929 | Pugh et al. | |
| 2,384,728 A | 9/1945 | Crumble | |
| 2,586,604 A * | 2/1952 | Bennett ........................... | 464/88 |
| 2,770,980 A | 11/1956 | Millward | |
| 2,854,857 A | 10/1958 | Gleasman et al. | |
| 3,279,779 A | 10/1966 | Thomas et al. | |
| 3,760,648 A | 9/1973 | Hoffman | |
| 3,776,061 A | 12/1973 | Yoshigai | |
| 3,915,029 A | 10/1975 | Shimada | |
| 3,972,247 A | 8/1976 | Armstrong | |
| 4,002,350 A * | 1/1977 | Timbs ........................... | 280/236 |
| 4,075,871 A * | 2/1978 | Burke ........................... | 464/117 |
| 4,100,820 A | 7/1978 | Evett | |
| 4,319,673 A | 3/1982 | Kojima | |
| 4,454,784 A | 6/1984 | Shimano | |

(Continued)

FOREIGN PATENT DOCUMENTS

| | | |
|---|---|---|
| CH | 248133 | 4/1947 |
| CN | 1144761 | 3/1997 |

(Continued)

OTHER PUBLICATIONS

Chinese Office Action, Appl. No. CN 200610090826.7, dated Apr. 3, 2009.

(Continued)

*Primary Examiner* — Marcus Charles
*Assistant Examiner* — Thomas Diaz
(74) *Attorney, Agent, or Firm* — Volpe and Koenig, P.C.

(57) ABSTRACT

The integrated control device (1) for driving the control cable (20) of the derailleur and the brake cable (16) of a bicycle is provided. The device having a support body (4) connectable to the handlebar (2) and that can be gripped by the cyclist's hand, a cable-winding bush (19) about which the control cable (20) of the derailleur is wound/unwound and a first lever (9) rotatable with respect to the support body (4) about a first axis (X1) for actuating the brake cable (16) and rotatable about a second axis (X2) to drive the cable-winding bush (19) into rotation in a first direction of rotation (R2). An indexing mechanism (12) connected to the first lever (9) cooperates with the cable-winding bush (19) to define predetermined angular positions therefor. The support body (4) having a recess (25) for the passage of the control cable (20) of the derailleur.

39 Claims, 9 Drawing Sheets

U.S. PATENT DOCUMENTS

| | | | |
|---|---|---|---|
| 4,459,871 | A | 7/1984 | Shimano |
| 4,605,240 | A | 8/1986 | Ciem et al. |
| 4,740,001 | A | 4/1988 | Torleumke |
| D298,309 | S | 11/1988 | Coue |
| 4,840,082 | A | 6/1989 | Terashima et al. |
| 4,885,951 | A | 12/1989 | Desenclos et al. |
| 4,930,368 | A | 6/1990 | Nagano |
| 4,945,785 | A | 8/1990 | Romano |
| 4,966,046 | A | 10/1990 | Tagawa |
| 5,012,692 | A | 5/1991 | Nagano |
| 5,020,387 | A | 6/1991 | Nagano |
| 5,050,444 | A | 9/1991 | Nishimura |
| 5,094,120 | A | 3/1992 | Tagawa |
| RE34,007 | E | 7/1992 | Desenclos et al. |
| 5,159,851 | A | 11/1992 | Rahmes |
| 5,186,071 | A | 2/1993 | Iwasaki |
| 5,203,213 | A | 4/1993 | Nagano |
| 5,213,005 | A | 5/1993 | Nagano |
| 5,222,412 | A | 6/1993 | Nagano |
| 5,241,878 | A | 9/1993 | Nagano |
| 5,257,683 | A * | 11/1993 | Romano .................. 192/217 |
| 5,279,179 | A | 1/1994 | Yoshigai |
| 5,287,765 | A | 2/1994 | Scura |
| 5,303,608 | A | 4/1994 | Iwasaki |
| 5,400,675 | A | 3/1995 | Nagano |
| 5,479,776 | A | 1/1996 | Romano |
| 5,480,356 | A | 1/1996 | Campagnolo |
| 5,515,743 | A | 5/1996 | Lumpkin |
| 5,528,954 | A | 6/1996 | Yoshigai |
| 5,601,001 | A | 2/1997 | Kawakami et al. |
| 5,676,020 | A | 10/1997 | Jordan et al. |
| 5,676,021 | A | 10/1997 | Campagnolo |
| 5,676,022 | A | 10/1997 | Ose |
| 5,755,139 | A | 5/1998 | Kojima |
| 5,787,757 | A | 8/1998 | Ozaki |
| 5,791,195 | A | 8/1998 | Campagnolo |
| 5,806,372 | A * | 9/1998 | Campagnolo .............. 74/473.14 |
| 5,832,782 | A | 11/1998 | Kawakami |
| 5,896,779 | A | 4/1999 | Biersteker et al. |
| 5,900,705 | A | 5/1999 | Kimura |
| 5,921,140 | A | 7/1999 | Lemmens et al. |
| 5,970,816 | A | 10/1999 | Savard |
| 6,073,730 | A | 6/2000 | Abe |
| 6,095,010 | A | 8/2000 | Arbeiter |
| 6,098,488 | A | 8/2000 | Vos |
| 6,370,981 | B2 | 4/2002 | Watarai |
| 6,457,377 | B1 | 10/2002 | Hsu |
| 6,502,477 | B1 | 1/2003 | Assel |
| 6,553,861 | B2 | 4/2003 | Ose |
| 6,564,670 | B2 | 5/2003 | Feng et al. |
| 6,564,671 | B2 | 5/2003 | Ose |
| 6,647,823 | B2 | 11/2003 | Tsumiyama et al. |
| 6,792,826 | B2 | 9/2004 | Dal Pra |
| 7,100,471 | B2 | 9/2006 | Irie et al. |
| 2002/0078789 | A1 | 6/2002 | Chen |
| 2002/0104401 | A1 | 8/2002 | Dal Pra' |
| 2002/0124679 | A1 | 9/2002 | Dal Pra' |
| 2002/0139637 | A1* | 10/2002 | Tsumiyama et al. ......... 192/217 |
| 2003/0094064 | A1 | 5/2003 | Dal Pra' |
| 2003/0167871 | A1 | 9/2003 | Irie et al. |
| 2003/0177855 | A1 | 9/2003 | Tsumiyama et al. |
| 2004/0144193 | A1* | 7/2004 | Sato et al. ................... 74/502.2 |
| 2004/0237697 | A1 | 12/2004 | Kawakami |
| 2004/0237698 | A1 | 12/2004 | Hilsky et al. |
| 2005/0241428 | A1 | 11/2005 | Tsai |
| 2006/0070480 | A1 | 4/2006 | Fujii |
| 2006/0207375 | A1 | 9/2006 | Jordan et al. |
| 2006/0272443 | A1* | 12/2006 | Tsumiyama ................ 74/502.2 |
| 2007/0034037 | A1 | 2/2007 | Dal Pra' et al. |
| 2007/0068332 | A1 | 3/2007 | Fujii et al. |
| 2007/0137388 | A1 | 6/2007 | Dal Pra' |
| 2007/0137391 | A1 | 6/2007 | Fujii |
| 2007/0178715 | A1 | 8/2007 | Fujii |
| 2007/0186715 | A1 | 8/2007 | Dal Pra' |
| 2007/0193386 | A1 | 8/2007 | Fujii |
| 2007/0204716 | A1 | 9/2007 | Dal Pra' |
| 2008/0098848 | A1 | 5/2008 | Dal Pra' et al. |
| 2008/0196537 | A1 | 8/2008 | Dal Pra' |
| 2008/0210041 | A1 | 9/2008 | Dal Pra' et al. |
| 2008/0210042 | A1 | 9/2008 | Dal Pra' |
| 2009/0025504 | A1 | 1/2009 | Dal Pra' et al. |
| 2009/0031846 | A1 | 2/2009 | Dal Pra' et al. |
| 2009/0133526 | A1 | 5/2009 | Dal Pra' et al. |

FOREIGN PATENT DOCUMENTS

| | | |
|---|---|---|
| CN | 2436412 | 6/2001 |
| CN | 2436412 Y | 6/2001 |
| CN | 1443679 | 9/2003 |
| CN | 1550405 | 12/2004 |
| DE | 3136922 | 3/1983 |
| DE | 3706545 | 9/1988 |
| DE | 19607640 | 1/1997 |
| DE | 202006006796 | 8/2006 |
| EP | 0371254 | 6/1990 |
| EP | 0371254 A1 | 6/1990 |
| EP | 0478901 | 4/1992 |
| EP | 0504118 | 9/1992 |
| EP | 0504118 A1 | 9/1992 |
| EP | 0361335 | 2/1994 |
| EP | 0601211 A1 | 6/1994 |
| EP | 0601221 | 6/1994 |
| EP | 0635422 | 1/1995 |
| EP | 0714826 | 6/1996 |
| EP | 0744334 | 11/1996 |
| EP | 0790175 | 8/1997 |
| EP | 1123861 | 8/2001 |
| EP | 1134158 A2 | 9/2001 |
| EP | 1245483 | 10/2002 |
| EP | 0785128 | 11/2002 |
| EP | 1264765 | 12/2002 |
| EP | 1 342 655 A2 | 9/2003 |
| EP | 1342655 | 9/2003 |
| EP | 1342655 A2 | 9/2003 |
| EP | 1440878 | 7/2004 |
| EP | 1 449 756 A1 | 8/2004 |
| EP | 1449756 | 8/2004 |
| EP | 1449756 A1 | 8/2004 |
| EP | 1473220 | 11/2004 |
| EP | 1481883 | 12/2004 |
| EP | 1502847 | 2/2005 |
| EP | 1 535 829 A2 | 6/2005 |
| EP | 1535829 | 6/2005 |
| EP | 1535829 A2 | 6/2005 |
| EP | 1564131 | 8/2005 |
| EP | 1642823 | 4/2006 |
| EP | 1698550 | 9/2006 |
| EP | 1739001 | 1/2007 |
| EP | 1816066 | 8/2007 |
| EP | 1826111 | 8/2007 |
| FR | 960276 | 4/1950 |
| FR | 2777528 | 10/1999 |
| FR | 2861686 | 2/2006 |
| GB | 615173 | 1/1949 |
| GB | 2012893 | 8/1979 |
| JP | 58003987 | 6/1956 |
| JP | 51060342 | 5/1976 |
| JP | 17893 | 1/1982 |
| JP | 17894 | 1/1982 |
| JP | 58030884 A | 2/1983 |
| JP | 224879 | 12/1983 |
| JP | 60107475 | 6/1985 |
| JP | 157092 | 10/1989 |
| JP | 2088384 | 3/1990 |
| JP | H02225191 A | 9/1990 |
| JP | 03292280 | 12/1991 |
| JP | 04331689 | 11/1992 |
| JP | H04331689 A | 11/1992 |
| JP | 05097088 A | 4/1993 |
| JP | 05286476 | 11/1993 |
| JP | 05286476 A | 11/1993 |
| JP | H05082786 U | 11/1993 |
| JP | H06016170 A | 1/1994 |
| JP | 07033063 A | 2/1995 |
| JP | 07251784 | 10/1995 |
| JP | 08328679 A | 12/1996 |
| JP | 2002347687 A | 12/2002 |
| JP | 2003261084 A | 9/2003 |

| | | |
|---|---|---|
| JP | 2004-249978 A | 9/2004 |
| JP | 2005153864 A | 6/2005 |
| JP | 61241287 | 10/2007 |
| TW | 136125 Y | 6/1990 |
| TW | 510875 | 11/2002 |
| TW | 519089 | 1/2003 |
| TW | 570013 Y | 1/2004 |
| TW | I223636 B | 11/2004 |
| WO | 9218374 | 10/1992 |
| WO | 03093094 | 11/2003 |
| WO | 2005044656 | 5/2005 |
| WO | 2005044656 A1 | 5/2005 |

OTHER PUBLICATIONS

Chinese Office Action, Appl. No. CN 200710005823.3, dated Sep. 25, 2009.

Chinese Office Action, Appln. No. CN200810082341.2, dated Nov. 30, 2010.

European Search Report, Appl. No. EP 05425458.6, dated Nov. 16, 2005.

European Search Report, Appl. No. EP 05017003.4, dated Dec. 20, 2005.

European Search Report, Appl. No. 06003694.4, dated Jul. 31, 2006.

European Search Report, Appl. No. RS 144832, dated Apr. 16, 2007.

European Search Report, Appl. No. RS 115409, dated Jul. 18, 2007.

European Search Report, Appl. No. RS 115410, dated Jul. 31, 2007.

European Search Report, Appl. No. RS115682, dated Oct. 30, 2007.

European Search Report, Appl. No. 08003760.9, dated Jun. 27, 2008.

European Search Report, Appl. No. EP 08003755.9, dated Jun. 27, 2008.

European Search Report, Appl. No. EP 08022485.0, dated Jul. 2, 2009.

European Search Report, Appl. No. 08005438.0, dated Nov. 5, 2010.

Japanese Office Action, Appl. No. JP 2002-332045, dated Dec. 16, 2008.

Japanese Office Action, Appl. No. JP 2008-550914, dated May 24, 2011.

* cited by examiner

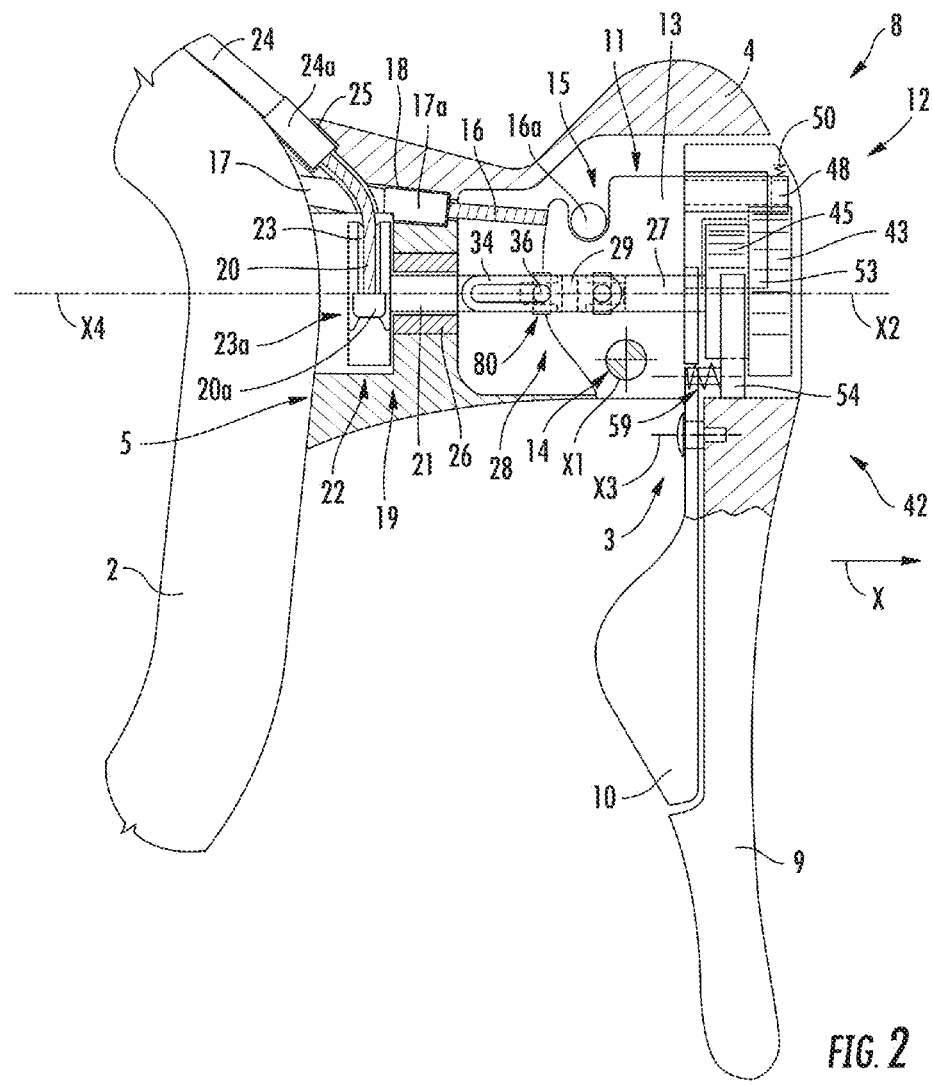
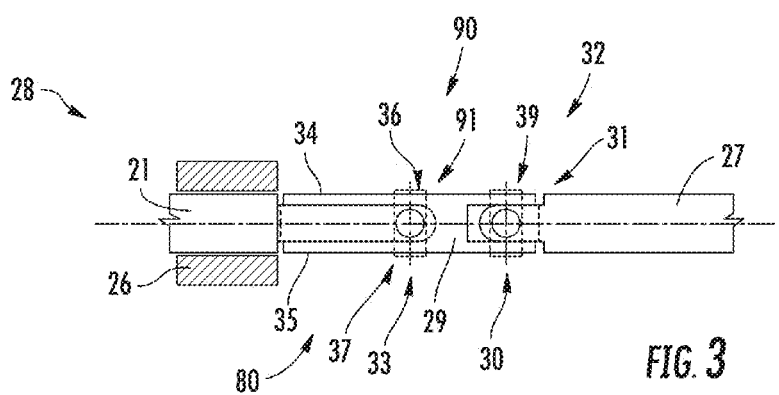

CONTROL DEVICE FOR A BICYCLE DERAILLEUR

FIELD OF THE INVENTION

The present invention refers to a control device used to drive a control cable of a bicycle derailleur. The following description is made with reference to devices configured in particular for bicycles with a curved handlebar (typical of racing bicycles).

BACKGROUND

A bicycle is usually provided with two derailleurs, a front one associated with the crankset and a rear one associated with the sprocket assembly. In both cases, the derailleur engages the transmission chain displacing it on toothed wheels having different diameters and different numbers of teeth, so as to obtain different gear ratios. The derailleur, be it the rear or the front, is moved in a direction by the traction action exerted by a normally sheathed inextensible cable (commonly known as Bowden cable) and in the opposite direction by the elastic return action of a spring provided in the derailleur itself. Normally, the direction in which the displacement is carried out by the return spring is that in which the chain passes from a toothed wheel with a greater diameter to a toothed wheel with a smaller diameter, i.e. that of so-called downward gearshifting; vice-versa, the traction action of the control cable occurs in the direction of so-called upward gearshifting, in which the chain moves from a toothed wheel with a smaller diameter to a toothed wheel with a greater diameter. It should be noted that in a front gearshift downward gearshifting corresponds to the passage to a lower gear ratio, whereas in a rear gearshift it corresponds to a higher gear ratio.

The displacement in the two directions of the control cable of a derailleur is obtained through a control device, commonly known as integrated control, mounted so as to be easily manipulated by the cyclist, i.e. normally on the handlebar, in proximity to handgrips thereof. The integrated control also comprises a brake lever for controlling a brake actuation cable of the front or rear wheel. Customarily, the control device of the front derailleur and the brake lever of the front wheel is situated on the left side of the handlebar, and vice-versa the control device of the rear derailleur and the brake lever of the rear wheel is situated on the right side of the handlebar.

In the control device, the control cable is actuated by traction or by release through winding and unwinding on a rotor element, commonly known as cable-winding bush or bobbin, whose rotation is controlled by the cyclist with corresponding control levers.

In integrated control devices of the known type, two distinct ratchet levers control the rotation, in two directions, of the bush and one of the two levers also controls the brake control cable.

Such a device has a support body that when mounted projects from the handlebar towards the front part of the bicycle, on which a first lever is mounted, corresponding to the brake lever, that rotates about a first axis to be actuated by the cyclist towards the handlebar during braking. The same brake lever is also rotatable about a second axis, perpendicular to the first, which controls the rotation of the cable-winding bush about its axis according to a first direction of rotation, to carry out upward gearshifting. Such a rotation substantially follows the movement of the cyclist's hand that pushes the lever inwards, i.e., towards the main axis of the bicycle.

The device also has a second lever rotatable about a third axis, parallel to the second, that when actuated inwardly, causes the released rotation of the cable-winding bush, through the effect of the spring of the derailleur, in a rotational direction opposite the first, resulting in downward gearshifting.

The cable-winding bush has an indexing mechanism associated therewith, which allows rotation of the cable-winding bush in the desired direction during gearshifting and keeps the cable-winding bush in the fixed angular position when the two levers do not act upon it. Both the indexing mechanism and the cable-winding bush are mounted on the first lever and are enclosed by a housing.

The rotation axis of the cable-winding bush, both in normal riding conditions and during braking, belongs to a substantially vertical plane comprising the advancing direction of the bicycle. The control cable of the derailleur that winds/unwinds about the cable-winding bush projects from the housing inwardly (FIG. 16), in a direction substantially perpendicular to said vertical plane, passing through a suitable opening formed in the housing itself. The control cable then reaches the derailleur through an appropriate path along the frame where the control cable is blocked in one or more attachment points.

The arrangement, however, has some drawbacks.

A first drawback noted is that the cable-winding bush, being mounted on the first lever, is a certain distance from the handlebar. Thus the control cable of the gearshift that projects from the housing causes potentially dangerous conditions for the cyclist, for example in the event there is accidental contact with nearby cyclists in a race or, in the event of falls, where the projecting cable entangles in the handlebar of other bicycles involved in the fall.

Another drawback noted is that the housing is not tightly closed since it is provided with an opening for the passage of the control cable, through which dirt or water can enter, that contribute to deteriorate the inner mechanisms of the control and reduce their performances.

A further drawback noted is the unpleasant appearance given to the bicycle by the projecting cables and added drag by reduced aerodynamics.

SUMMARY

The object of the present invention is to overcome said drawbacks. A first object of the invention is to create a control device that improves the cyclist's safety conditions with respect to controls of a known type.

Another object of the invention is to make a control device with better characteristics of tightness with respect to control devices of a known type.

Such objects are accomplished through an integrated control device for driving a control cable of a derailleur and for driving a brake cable of a brake of a bicycle, comprising a support body connectable on one side to a handlebar and having a part, projecting from said side, that can be gripped by the cyclist's hand; a cable-winding bush or bobbin about which said control cable of the derailleur is wound/unwound; a first lever rotatable with respect to said support body about a first axis actuating said brake cable and rotatable about a second axis for driving said cable-winding bush into rotation in a first direction of rotation; wherein said support body comprises a recess for the passage of said control cable of the derailleur.

BRIEF DESCRIPTION OF THE DRAWINGS

Further features and advantages of the invention shall become clearer from the description of preferred embodiments, made with reference to the attached drawings, wherein like numerals refer to like elements:

FIG. 2 shows a section view along a middle section plane of the control device of FIG. 1 in a first operating position;

FIG. 3 shows a bottom view of a detail of FIG. 2;

DETAILED DESCRIPTION OF THE PREFERRED EMBODIMENTS

Introduction to the Embodiments

The present invention is an integrated control device for driving a control cable of a derailleur and for driving a brake cable of a brake of a bicycle, comprising a support body connectable on one side to a handlebar and having a part, projecting from said side, that can be gripped by the cyclist's hand; a cable-winding bush or bobbin about which said control cable of the derailleur is wound/unwound; a first lever rotatable with respect to said support body about a first axis actuating said brake cable and rotatable about a second axis for driving said cable-winding bush into rotation in a first direction of rotation; wherein said support body comprises a recess for the passage of said control cable of the derailleur.

Preferably, the recess is made in proximity to the side of the support body connectable to the handlebars and can extend in at least one portion of the projecting part of the support body itself.

Alternatively or in addition, the recess can be open towards the outside.

Preferably, the cable-winding bush is mounted on the support body.

Preferably, moreover, the integrated control device comprises an indexing mechanism connected to said first lever and cooperating with said cable-winding bush to define predetermined angular positions for said cable-winding bush.

More preferably, a transmission mechanism is arranged between the cable-winding bush and the indexing mechanism.

Preferably, the transmission mechanism comprises an intermediate shaft, a first cardan joint and a second cardan joint, wherein the first cardan joint connects the intermediate shaft to the indexing mechanism and the second cardan joint connects the intermediate shaft to the cable-winding bush.

Preferably, the transmission mechanism comprises a sliding connection that allows the displacement by rotation of the indexing mechanism about the first axis when the brake cable is actuated in a braking operation.

Even more preferably, the sliding connection comprises a pair of slots made on the intermediate shaft that slidably receive a projecting element associated with the shaft of the cable-winding bush.

Preferably, the control device comprises a second lever rotatable with respect to the support body about a third axis for driving the cable-winding bush into rotation in a second direction of rotation opposite the first one.

Even more preferably, the second lever is pivoted on the first lever and the first and the second lever are actuated in the same direction to drive the cable-winding bush into rotation in the two directions winding and unwinding the control cable.

Preferably, the support body has a second recess for sliding the brake cable and made in proximity to the side of the support body connectable to the handlebars.

Advantageously, both the brake cable and the control cable come out from the control device in proximity to the handlebars without projecting from the control itself.

DETAILED DESCRIPTION

Figure 1:
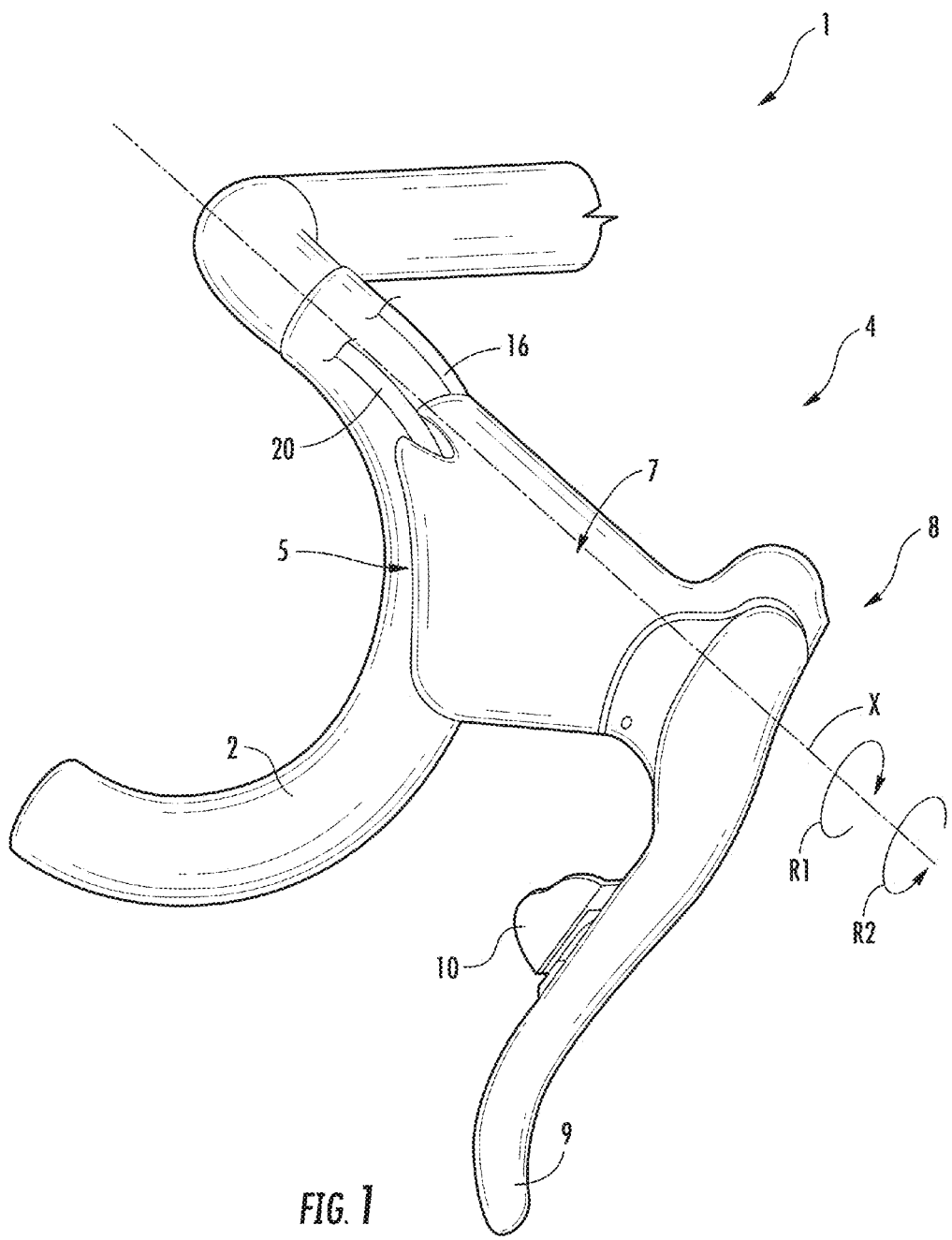
FIG. 1 shows an isometric view of the control device of the invention.

In FIG. 1 the control device 1 of the invention is shown. The control device 1 is a right control device, in other words mounted on the right curved portion of a handlebar 2 and performs the gearshifting operations of the rear derailleur.

The following description is made for such a right control device 1, but it is understood that the inventive concept can be applied to the left control device mounted on the left curved portion of the handlebar 2 and associated with the front derailleur.

The control device 1 comprises a support body 4 connected at one side 5 to the handlebar 2 and a part 7, projecting from the side 5, that can be gripped by the cyclist.

The support body 4 is connected to the handlebar 2 in a conventional way, for example by means of a clip (not shown).

A control group 8 is associated with the support body 4, the control group comprising an indexing mechanism 12, a first and a second lever 9, 10 mechanically cooperating with the indexing mechanism 12, and a support element 11 pivotable to the support body 4 on a pin 14 arranged along a first rotation axis X1, substantially perpendicular to the forward or travel direction X of the bicycle.

The first lever 9, rotatable about a second axis X2, and the indexing mechanism 12 are mounted on the support element 11. The second lever 10 is pivotable on the first lever 9 on a rotation pin 3 arranged along a third rotation axis X3 that, in operation as shown in FIG. 2, substantially coincides with the forward direction X of the bicycle. The indexing mechanism 12, as shall be seen more clearly hereafter, has a main shaft 27 that assumes predetermined angular positions corresponding to the position of the rear derailleur as selected by the cyclist. The support element 11 consists of a plate 13 pivoted about the support body 4 on the aforementioned pin 14. The plate 13 has an open cylindrical seat 15 that receives the widened head 16a of the brake cable 16. The outer sheath 17 of the brake cable 16 is positioned with its end 17a within a cylindrical recess 18 of the support body 4.

In proximity to the handlebar 2 the cable-winding bush, or bobbin, 19 of the control cable 20 of the derailleur is placed, such a cable-winding bush 19 arranged with its rotational axis X4 substantially coinciding with the advancing direction X of the bicycle.

The cable-winding bush 19 comprises a rotation shaft 21 and a shank or spool 22 at one of its ends, said spool having a throat, or groove 23 for winding/unwinding the control cable 20 of the derailleur. The groove 23 comprises a seat 23a that receives the widened head 20a of the control cable 20 of the derailleur. The outer sheath 24 of the control cable 20 is placed with its end 24a within a cylindrical recess 25 of the support body 4 in proximity to the side 5 connectable to the handlebar 2.

The control cable 20 is subject to the traction force exerted by the return spring of the derailleur (not shown), such a force in turn is applied to the cable-winding bush 19 that is therefore kept urged in the first direction R1 (clockwise direction with reference to FIGS. 5 to 13).

An anti-friction bushing 26 is placed between the shaft 21 of the cable-winding bush 19 and the support body 4.

The shaft 21 of the cable-winding bush 19 and the main shaft 27 of the indexing mechanism 12 are interconnected through a transmission mechanism, wholly indicated with 28.

The transmission mechanism 28, as shown in FIG. 3, comprises an intermediate shaft 29 connected at the first end 30 to the free end 31 of the main shaft 27 by a first cardan joint 32 and connected at the second end 33 to the shaft 21 of the cable-winding bush 19 by a second cardan joint 90.

As far as the first cardan joint 32 is concerned, it consists, in a conventional way, of a four point cross 39 connected by means of four links to a driving fork and to a driven fork made, respectively, at the free end 31 of the main shaft 27 and at the first end 30 of the intermediate shaft 29.

The second cardan joint 90 consists, in a conventional way, of a four point cross 91 connected by means of four links to the second end 33 of the intermediate shaft 29 and to the free end of the shaft 21 of the cable-winding bush 19.

A sliding connection 80 is defined between the intermediate shaft 29 and the shaft 21 of the cable-winding bush 19. Such a sliding connection 80 comprises two slots 34, 35, made on the portion of the intermediate shaft 29 towards its second end 33, which slidably receive two projecting ends 36, 37 of the four point cross 91.

Figure 4:
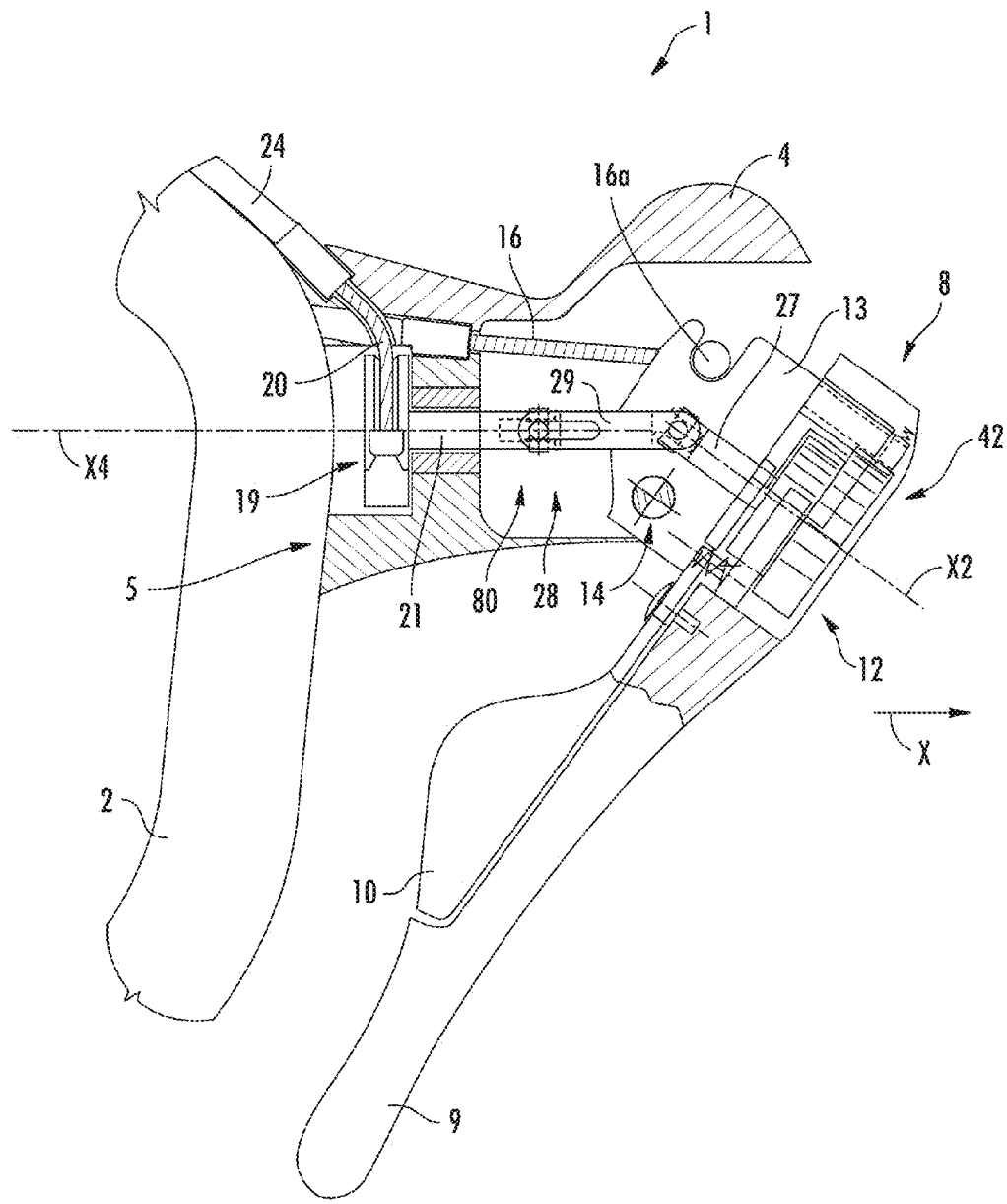
FIG. 4 shows a section view along a middle section plane of the control device of FIG. 1, in a second operating position.
Figure 5:
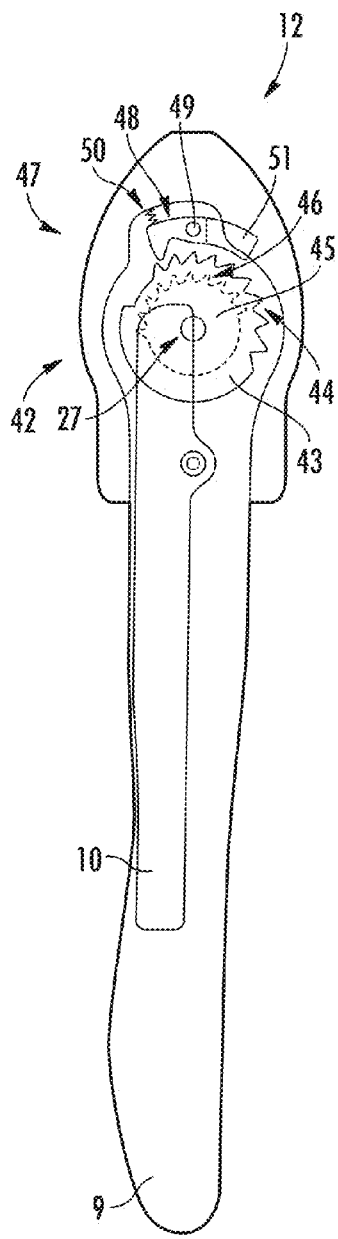
FIGS. 5 to 7 show front views of the device of FIG. 1 in different operative states during upward gearshifting.

The sliding connection 80 allows the axial sliding of the intermediate shaft 29 with respect to the shaft 21 of the cable-winding bush 19, as shown in the two different operative states of FIGS. 2 and 4, and further described hereafter.

The transmission mechanism 28 therefore consists of a double cardan joint with an intermediate shaft and a sliding connection that allow both the transmission of the rotary motion between the main shaft 27 and the shaft 21 of the cable-winding bush 19, a situation that occurs during gearshifting, and the positioning of the shafts themselves along mutually sloped directions, a situation that occurs during braking (FIGS. 2 and 3).

In other embodiments, the sliding connection is made in different ways, for example by providing for two slots formed on the portion of intermediate shaft 29 towards its first end 30 that slidably receive the projecting ends of the four point cross of the first cardan joint 32 or by providing for, instead of the slots 34, 35, the separation of one of the shafts among the main shaft 27, the intermediate shaft 29 or the rotation shaft 21 of the cable-winding bush 19 into two telescopic semi-shafts that are integral in rotation.

The control group 8 is described with particular reference to FIGS. 5 to 13 and consists, as stated above, of the first and second lever 9 and 10, of the indexing mechanism 12 and of the support element 11.

The indexing mechanism 12 comprises an indexer 42 provided with the aforementioned main shaft 27 and is rotatable with respect to the support element 11 about the second rotational axis X2 that, in the operative state of FIG. 2, is aligned with rotational axis X4 of the shaft 21 of the cable-winding bush 19. The indexer 42 consists of a first sector 43 provided on the outer peripheral surface with first meshing teeth 44, and a second sector 45, adjacent and coaxial to the first sector 43, and provided on the outer peripheral surface with second meshing teeth 46. The main shaft 27, the first sector 43 and the second sector 45 are integral in rotation about the second rotational axis X2.

The indexing mechanism 12 further comprises a first ratchet gear 47 (FIGS. 5 to 7) associated with the first lever 9, consisting of a first pawl 48 pivoted on the first lever 9 through a pin 49 and of a first spring 50 that acts by pushing on the tip of the first pawl 48 towards the first teeth 44 of the first sector 43. An abutment block 51, integral with the support element 11, cooperates with the first pawl 48 to keep it disengaged from the first teeth 44 when the first lever 9 is in a rest position, as shown in FIGS. 5, 7, 11, and 13.

The indexing mechanism 12 further comprises a second ratchet gear 52 (FIGS. 8 to 10) associated with the second lever 10, consisting of second and third pawls 53, 54 pivotable on the support element 11 through respective pins 55, 56. The second pawl 53 has an interference tooth 57 that cooperates with the first teeth 44 of the first sector 43 and an abutment zone 58 for the second lever 10. The third pawl 54 has a retention tooth 97 that cooperates with the second teeth 46 of the second sector 45 of the indexer 42, a helical spring 59 that acts by urging the third pawl 54 towards the second teeth 46 of the second sector 45 and an abutment zone 60 for the second pawl 53.

The first and the second lever 9, 10 are provided with return springs, not shown in the figures, which push the levers in the first clockwise rotational direction R1 towards their rest positions.

Figure 11:
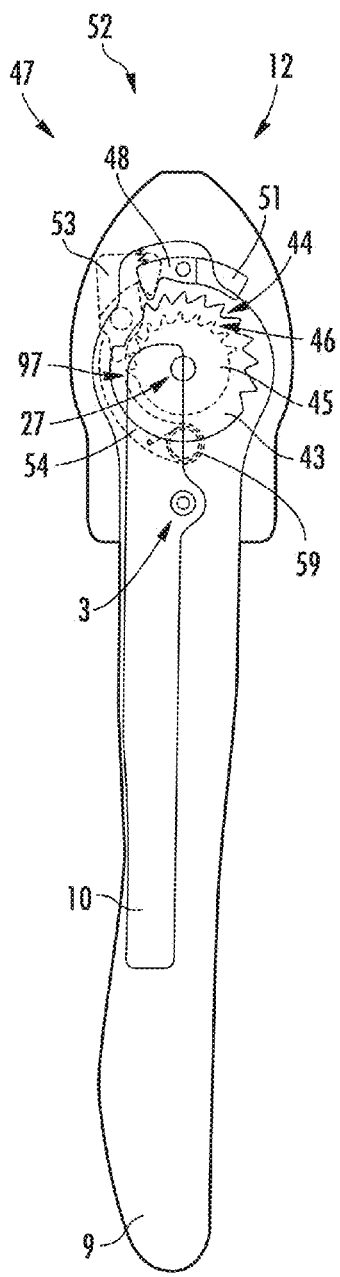
FIGS. 11 to 13 show other front views of the device of FIG. 1 in different operative conditions during upward gearshifting.
Figure 12:
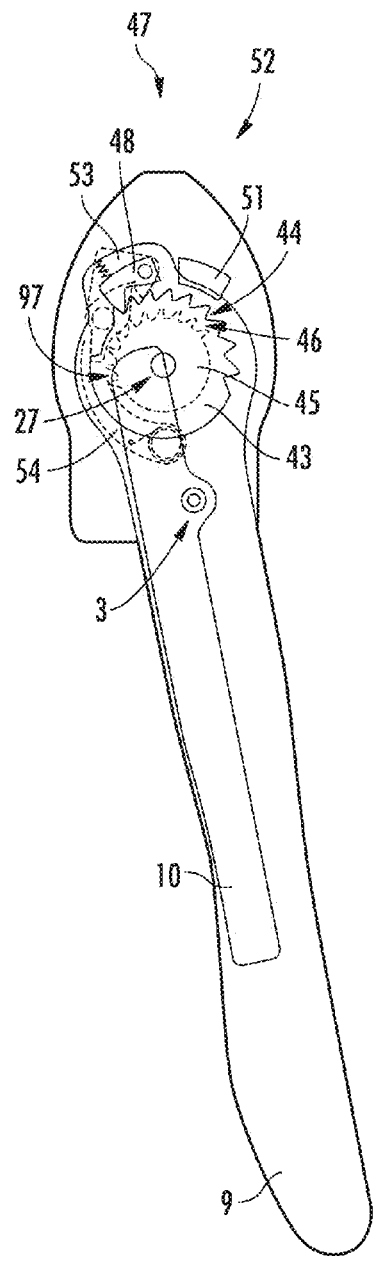
Figure 13:
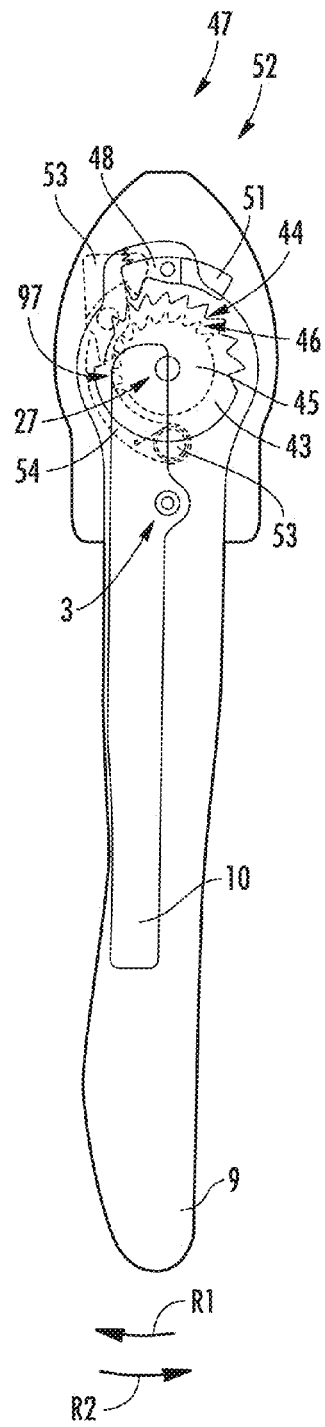

In FIGS. 11 to 13 the first and second ratchet gear 47, 52 described above are both depicted.

The first lever 9 embodies the brake lever. When the cyclist acts to brake by pulling the first lever 9 towards the handlebar 2, plate 13 rotates about the pin 14, as shown in FIG. 4, making the two levers 9, 10 rotate together with the indexing mechanism 12 and pulling the widened head 16a of the brake cable 16 to carry out braking.

The first lever 9 also embodies the lever for upward gearshifting, corresponding to the traction of the control cable 20 and its winding about the cable-winding bush 19 in the second direction of rotation R2.

In rest conditions (FIGS. 5, 7, 8, 10, 11 and 13), the first and second levers 9, 10 are substantially vertical, the first pawl 48 is disengaged with respect to the first teeth 44 of the first sector 43, the retention tooth 97 of the third pawl 54 is engaged in a gap defined between two teeth belonging to the second teeth 46 of the second sector 45. The engagement of the retention tooth 97 of the third pawl 54 keeps the indexer 42 in a fixed angular position since it is subject to the traction force of the return spring of the derailleur in the first direction of rotation R1, transmitted by the cable-winding bush 19 through the transmission mechanism 28.

Figure 6:
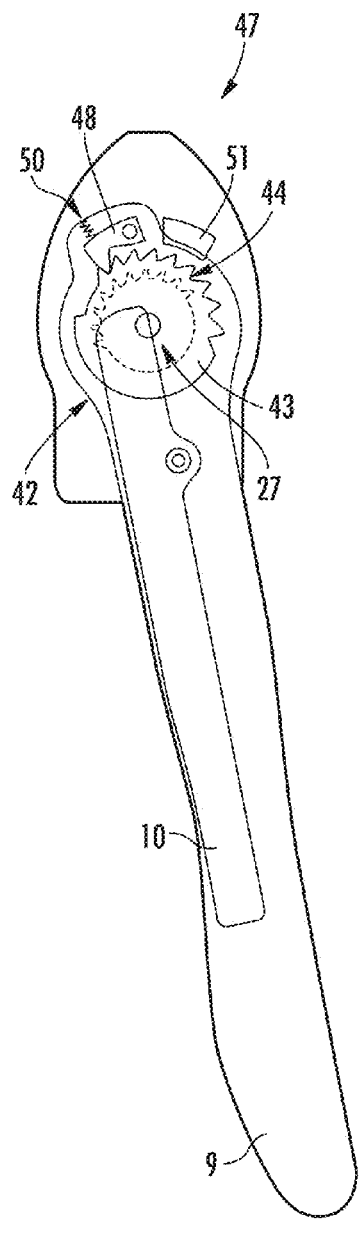
Figure 7:
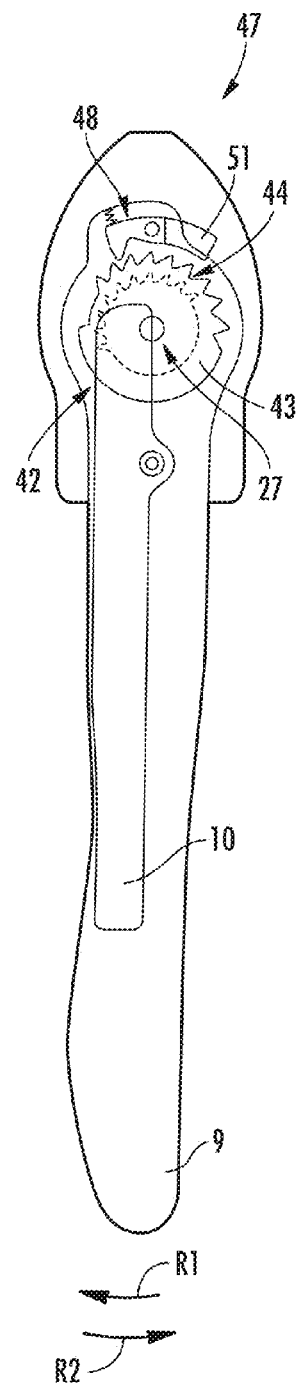
Figure 8:
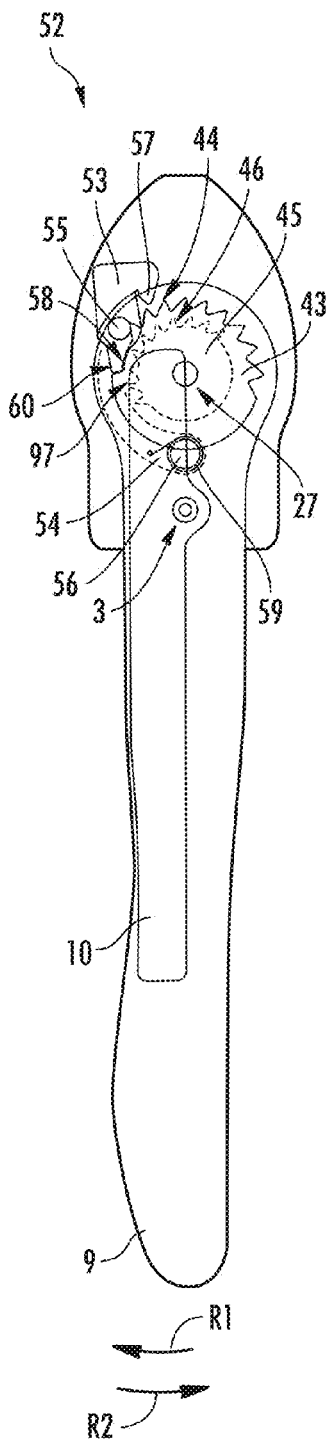
FIGS. 8 to 10 show front views of the device of FIG. 1 in different operative conditions during downward gearshifting.

When one wishes to carry out upward gearshifting, i.e. to wind the control cable 20 about the cable-winding bush 19 in the second direction of rotation R2 (counterclockwise in FIG. 1) the first lever 9 is actuated in the second direction of rotation (counterclockwise) R2 (FIGS. 6 and 12). During such a rotation, the second lever 10 moves with the first lever 9 on which it is mounted, whereas the first pawl 48 disengages from the support block 51 and is pushed into engagement in a gap defined between two teeth belonging to the first teeth 44 of the first sector 43. The third pawl 54 is pushed radially outwards by the second teeth 46 of the second sector 45 (FIG. 12), on which it slides following its profile with the retention tooth 97. after sufficient angular rotation, the retention tooth 97 of the third pawl 54 engages in the subsequent gap defined by two teeth belonging to the second teeth 46. When the first lever 9 is released, it and the second lever 10 return to their initial vertical condition (FIGS. 7 and 13), by their respective return springs, and the indexer 42 is held in the new angular position by the retention tooth 97 of the third pawl 54.

Figure 9:
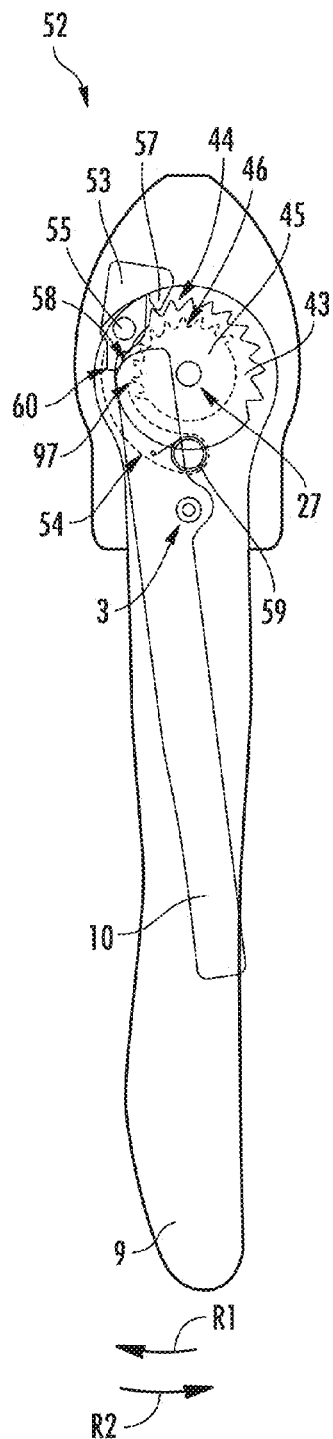
Figure 10:
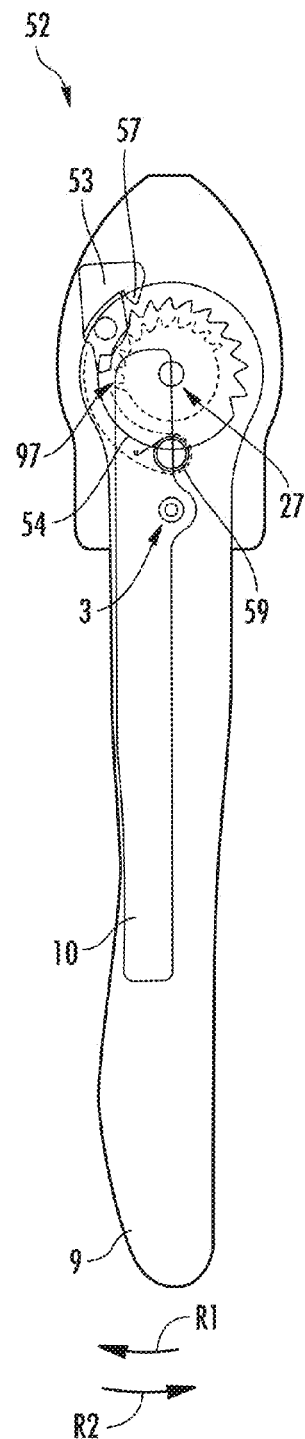

When one wishes to carry out downward gearshifting, i.e. to unwind the control cable 20 from the cable-winding bush 19 in the first direction of rotation R1 (clockwise), the second lever 10 is actuated in the second direction of rotation R2 (counterclockwise) (FIG. 9). During such a rotation, the first lever 9 stays still, whereas the second lever 10 pushes the abutment zone 58 of the second pawl 53 and the second pawl 53 pushes the abutment zone 60 of the third pawl 54 displacing its retention tooth 97 outside of the gap of the second teeth 46 in which it is engaged. The indexer 42, in such a state, freely rotates in release by a first angle in the first direction of rotation R1 (clockwise) since it is subject to the transmission force of the spring of the derailleur. At the same time, the interference tooth 57 of the second pawl 53 engages the first teeth 44 of the first sector 43, temporarily blocking the indexer 42. The subsequent release of the second lever 10 (FIGS. 9 and FIG. 10) allows the third pawl 54 to be pushed again towards the second teeth 46 of the second sector 45 to engage it in the subsequent gap with its retention tooth 97 after a further free rotation in release of the indexer 42 by a second angle. At the same time, the second pawl 53 disengages with its interference tooth 57 from the first teeth 44 of the first sector 43. In the final position reached (FIG. 10), the indexer 42 is held in the desired new fixed angular position by the retention tooth 97 of the third pawl 54.

The description of the upward and downward gearshifting operations have been made with the control device in a non-braking situation.

The same operations can be carried out in braking situations (FIG. 4) with the first and second lever 9, 10 pulled towards the handlebar 2, since the rotation of the indexer 42 and the transmission of the rotation to the cable-winding bush 19 during upwards and downward gearshifting is still provided by the transmission mechanism 28.

From what has been described it is shown that the control device 1 of the invention, besides providing the braking and gearshifting operations, allows the cable-winding bush 19 and the control cable 20, in addition to the brake cable 16, to be disposed within the projecting part 7 of the support body 4 in a position close to the side 5 of the support body 4 connectable to the handlebar. This allows the control cable 20 not to project from the control device 1, thus overcoming the drawbacks of certain conventional control devices.

The described control device 1, and in particular the associated control group 8, is a release type, in other words a control device wherein downward gearshifting operation, with the rotation of the cable-winding bush in the first direction of rotation R1, is obtained by the free rotation of the cable-winding bush since it is subject to the traction force of the spring associated with the derailleur.

In other embodiments, however, the control group could be of a different type, for example of the type described in U.S. Pat. No. 5,791,195 assigned to the same Assignee of the present invention, in which both the upward and downward gearshifting operations are obtained by an action resulting in pushing on the cable-winding bush. In such a case the respective upward and downward gearshifting levers are actuated in opposite directions to rotate the cable-winding bush, through respective ratchet gears, in the winding and unwinding directions of the control cable.

Figure 14:
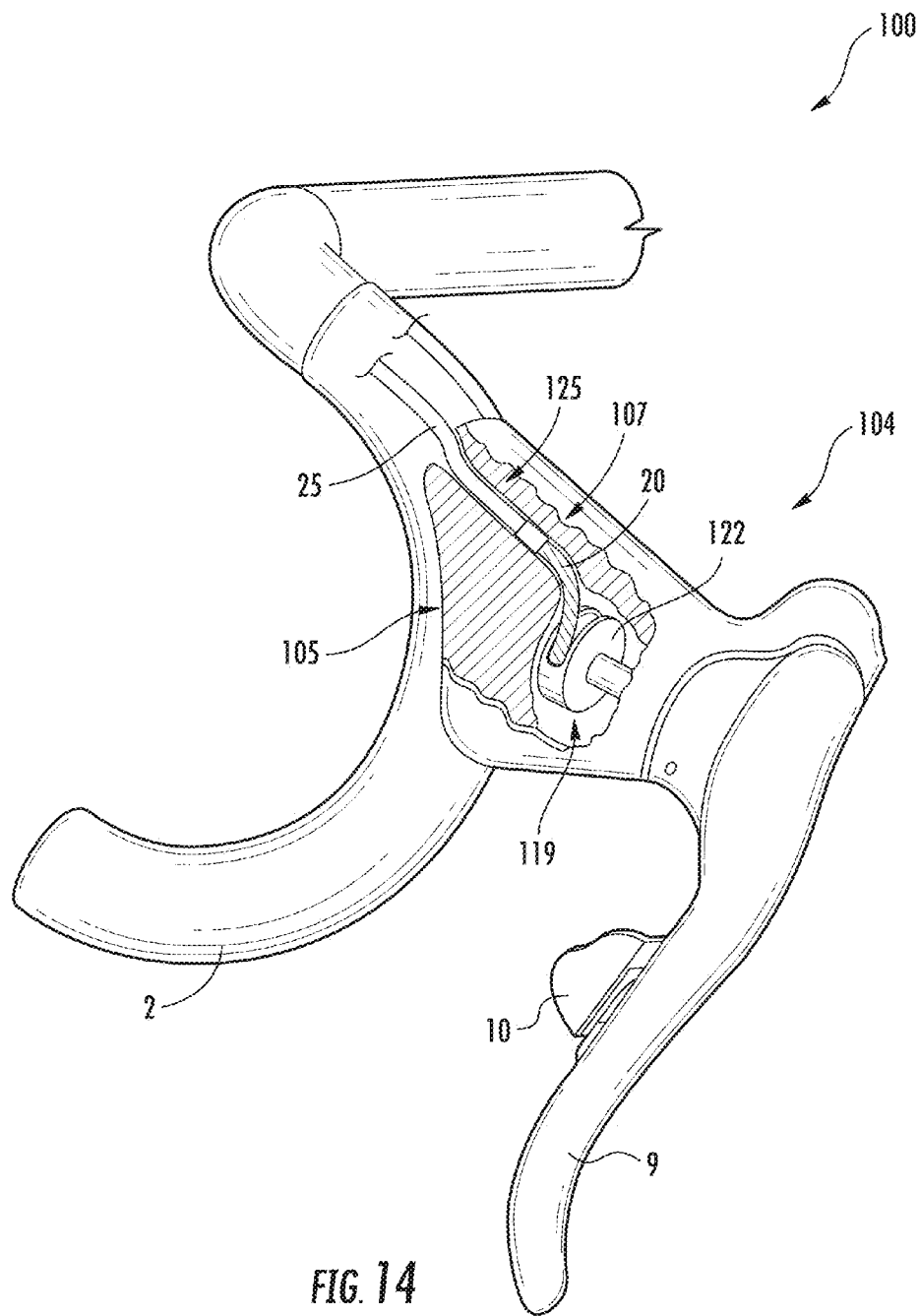
FIG. 14 shows a partially sectioned isometric view of a first variant of the control device of FIG. 1.

In FIG. 14 a first variant of the device of the invention 100 is shown, that differs from the previously described embodiment in the different arrangement of the first recess 125 for receiving the control cable 20 and the respective sheath 25.

This type of solution is applicable to control devices of the type shown here, wherein the cable-winding bush 119 is positioned inside the projecting part 107 of the support body 104 not in proximity to the side 105 of the support body 104 connectable to the handlebar 2 but displaced towards the first lever 9 and the second lever 10.

As shown in the section of FIG. 14, the first recess 125 extends inside the projecting part 107 of the support body 104 starting from the side 105 of the support body 104 connectable to the handlebar 2 up to in proximity to shank or spool 122 of the cable-winding bush 119. The portion of the projecting part 107 of the support body 104 where the first recess 125 extends is variable in length in different embodiments.

Figure 15:
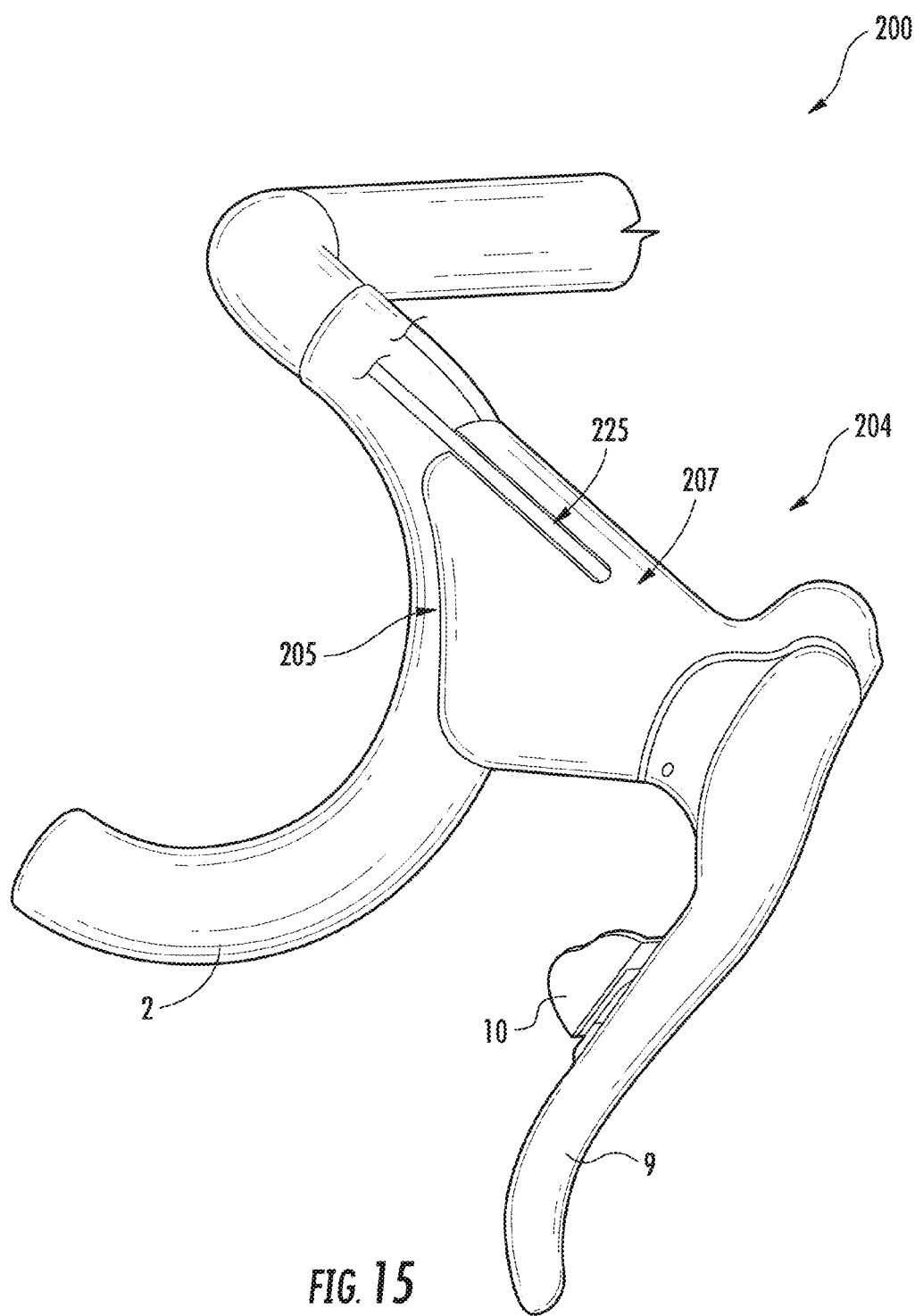
FIG. 15 shows an isometric view of a second variant of the control device of FIG. 1.
Figure 16:
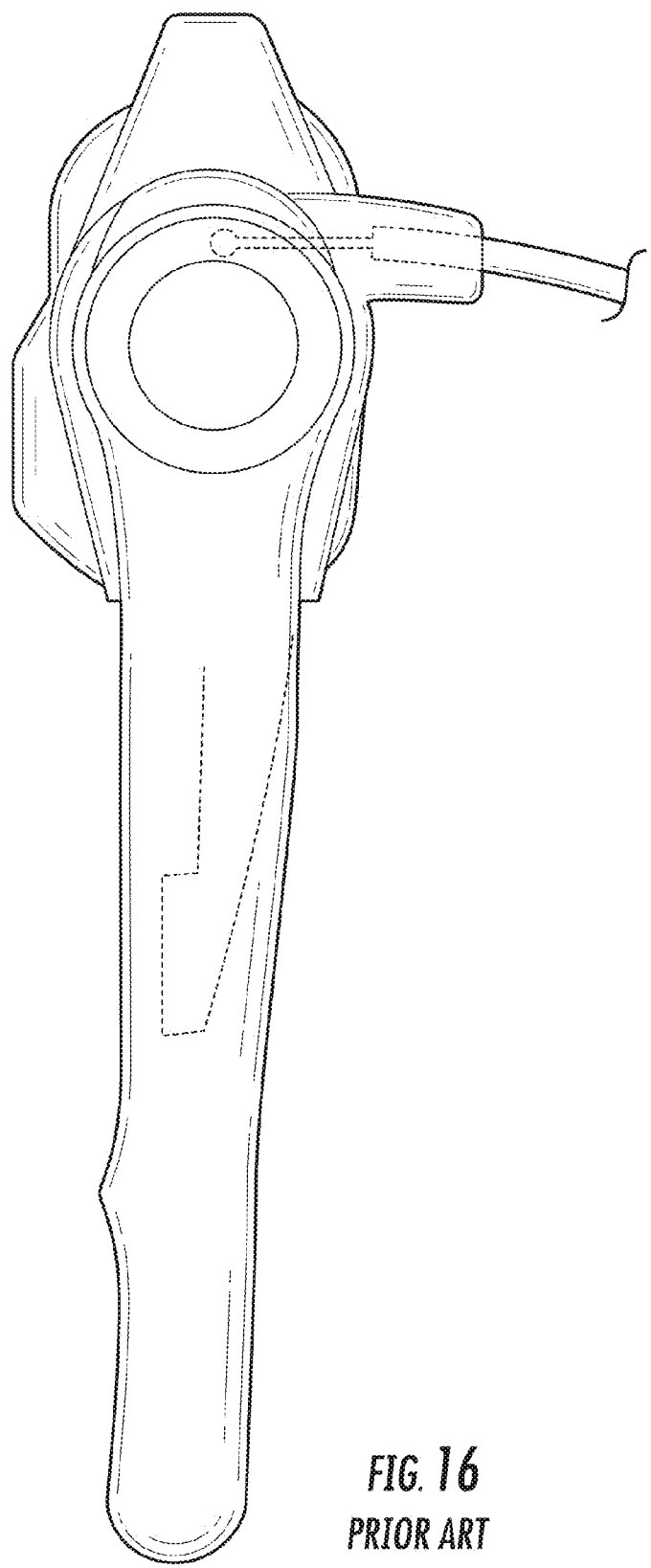
FIG. 16 shows a control device of the prior-art.

In FIG. 15 a variant of the device of the invention 200 of the type shown in FIG. 14 is represented, i.e. with the cable-winding bush positioned towards the first lever 9 and the second lever 10.

Such a solution differs from that shown in FIG. 14 in that the first recess 225 that extends on the projecting part 207 of the support body 204 starting from the side 205 of the support body 204 connectable to the handlebar 2, is a recess that is open towards the outer surface of the support body 204.

The support body 204 is also advantageously endorsed with a covering sheath, not shown in the figures.

It should be understood that a covering sheath is also normally applied in all of the solutions previously described.

It is also understood that the inner control mechanism of the various embodiments, which i.a. allows the translation and rotation of the indexing mechanism so as to make gearshifting operations also possible during braking, could be used in an innovative way also independently of the formation of the recess according to the teachings of the present invention.

What is claimed is:

1. Integrated control device for driving a control cable of a derailleur and for driving a brake cable of a brake of a bicycle, comprising:
   a support body connectable at one side to a handlebar and having a part, projecting from said side, that is configured to be gripped by a cyclist's hand;
   a cable-winding bush about which said control cable of the derailleur is wound/unwound;
   a first lever rotatable with respect to said support body about a first axis for actuating said brake cable and rotatable about a second axis for driving said cable-winding bush into rotation in a first direction of rotation;
   an indexing mechanism connected to said first lever and cooperating with said cable-winding bush to define predetermined angular positions for said cable-winding bush; and
   a transmission mechanism with a sliding connection positioned between said indexing mechanism and said cable-winding bush that allows for displacement of said indexing mechanism with respect to said cable-winding bush and rotation of said indexing mechanism about said first axis;
   wherein said support body comprises a recess for the passage of said control cable of the derailleur.

2. Device according to claim 1, wherein said recess is closer to said side of said support body connectable to the handlebar than to an opposite side thereof.

3. Device according to claim 2, wherein said recess is suitable for receiving an outer sheath of said control cable.

4. Device according to claim 1, wherein said cable-winding bush is mounted on said support body.

5. Device according to claim 1, wherein said sliding connection comprises at least two telescopic shafts.

6. Device according to claim 1, wherein said second axis is substantially perpendicular to said first axis.

7. Device according to claim 1, further comprising a second lever rotatable with respect to said support body about a third axis which drives said cable-winding bush into rotation in a second direction of rotation opposite the first one.

8. Device according to claim 7, wherein said second lever is directly connected to and pivoted on said first lever.

9. Device according to claim 7, wherein said first lever and said second lever are actuated in the same direction to drive said cable-winding bush into rotation.

10. Device according to claim 7, wherein said first lever and said second lever are actuated in opposite directions, corresponding to upshifting or downshifting, to drive said cable-winding bush into rotation.

11. Device according to claim 7, wherein said indexing mechanism comprises:
 a) an indexer;
 b) a first ratchet gear, associated with said first lever, for the rotation of said indexer in said first direction of rotation;
 c) a second ratchet gear, associated with said second lever, for the rotation of said indexer in said second direction of rotation opposite the first.

12. Device according to claim 11, wherein said indexer comprises a main shaft rotating about said second axis, a first toothed sector and a second toothed sector adjacent and coaxial to said main shaft along said second axis.

13. Device according to claim 11, wherein said first ratchet gear comprises a first pawl having an interference tooth suitable for engaging said indexer.

14. Device according to claim 11, wherein said second ratchet gear comprises a pawl provided with an interference tooth suitable for engaging said indexer.

15. Device according to claim 11, wherein said second ratchet gear comprises a pawl having a retention tooth suitable for engaging said indexer.

16. Device according to claim 11, wherein said first and second ratchet gears allow the free rotation of said indexer in said second direction of rotation.

17. Device according to claim 11, wherein said first and second ratchet gears cause the rotation by pushing on said indexer in said second direction of rotation.

18. Device according to claim 1, wherein said support body comprises a second recess suitable for slidably receiving said brake cable.

19. Device according to claim 18, wherein said second recess is closer to said one side of said support body than to an opposite side of said support body.

20. Device according to claim 18, wherein said second recess is suitable for receiving the outer sheath of said brake cable.

21. Control device for driving a control cable of a derailleur of a bicycle, comprising:
 a support body connectable to a handlebar;
 a cable-winding bush about which said control cable of the derailleur is wound/unwound;
 a first lever rotatable with respect to said support body about an axis for driving said cable-winding bush into rotation in a first direction of rotation;
 an indexing mechanism connected to said first lever and cooperating with said cable-winding bush to define predetermined angular positions for said cable-winding bush; and
 a transmission mechanism arranged between said indexing mechanism and said cable-winding bush, wherein said transmission mechanism comprises an intermediate shaft, a first cardan joint, and a second cardan joint, said first cardan joint connecting said intermediate shaft to said indexing mechanism, and said second cardan joint connecting said intermediate shaft to said cable-winding bush.

22. Integrated control device for driving a control cable of a derailleur and for driving a brake cable of a brake of a bicycle, comprising:
 a) a support body connectable at one side to handlebars and having a part, projecting from said side, that can be gripped by the cyclist's hand;
 b) a cable-winding bush about which said control cable of the derailleur is wound/unwound; and
 c) a first lever rotatable with respect to said support body about a first axis for actuating said brake cable and rotatable about a second axis for driving said cable-winding bush into rotation in a first direction of rotation;
 wherein the device further comprises an indexing mechanism connected to said first lever and cooperating with said cable-winding bush to define predetermined angular positions for said cable-winding bush and wherein a transmission mechanism comprising an intermediate shaft, a first cardan joint connecting said intermediate shaft to said indexing mechanism, and a second cardan joint, connecting said intermediate shaft to said cable-winding bush, is arranged between said indexing mechanism and said cable-winding bush and wherein said support body comprises a recess for the passage of said control cable of the derailleur.

23. Integrated control device for a derailleur control cable and a brake cable, the device comprising:
 a) a support body configured at one side for attachment to a handlebar and at another opposed side for attachment of a control group;
 b) a cable-winding bush, about which said derailleur control cable is wound/unwound, mounted within said support body for rotation about an axis extending from said handlebar side to said control group side; and
 c) a lever that is mechanically connected to said cable-winding bush through a double cardan joint and controls one of said winding and said unwinding of said cable; and;
 d) a passage that is inclined with respect to said cable-winding bush and that extends through the support body from a position that is closer to the handlebar attachment side to a position closer to said cable winding bush.

24. The integrated control device of claim 23, wherein the support body is mountable to a curved handlebar at a curved portion thereof.

25. The integrated control device of claim 23, further comprising a second passage generally parallel to the first passage.

26. The integrated control device of claim 25, wherein the second passage is closer to the handlebar attachment side of the support body than to an opposite side thereof.

27. The integrated control device of claim 23, wherein the cables are routed along the handlebar.

28. The integrated control device of claim 23, wherein the cable-winding bush is housed within the support body closer to the handlebar attachment side than the opposed side.

29. The integrated control device of claim 23, further comprising an indexer connected to the cable-winding bush, the indexer regulating the angular movement of the cable-winding bush in pre-defined increments.

30. Integrated control device for driving a control cable of a derailleur and for driving a brake cable of a brake of a bicycle, comprising:
 a support body connectable to handlebars;

a support element hingedly connected to the support body for driving the brake cable;

a cable-winding bush, located within the support body connectable to handlebars, rotatable about a rotational axis for winding/unwinding said control cable of the derailleur about said rotational axis, the rotational axis being fixed in relation to the support body connectable to handlebars;

an indexing mechanism cooperating with said cable-winding bush to define predetermined angular positions for said cable-winding bush, said indexing mechanism being supported by and moves with the support element; and a transmission mechanism having an intermediate shaft, a first cardan joint, and a second cardan joint, said first cardan joint connecting said intermediate shaft to said indexing mechanism, and said second cardan joint connecting said intermediate shaft to said cable-winding bush.

31. Device according to claim 30, wherein said indexing mechanism is movable with said support element between a first position, corresponding to the brake cable not being actuated, at which a main shaft of said indexing mechanism is aligned with a shaft of the cable-winding bush, and a second position, corresponding to the brake cable being actuated, at which the main shaft of said indexing mechanism is sloped with respect to the shaft of said cable-winding bush.

32. Device according to claim 30 wherein said transmission mechanism comprises a sliding connection suitable for allowing the displacement of said indexing mechanism with respect to said cable-winding bush.

33. Device according to claim 32, wherein said sliding connection comprises at least one slot that slidably receives a projecting element associated with said cable-winding bush or with said indexing mechanism.

34. Device according to claim 32, wherein said sliding connection comprises at least two telescopic shafts.

35. Device according to claim 30, wherein an axis about which said support element is hingedly connected to said support body is perpendicular to an axis of said cable-winding bush.

36. Integrated control device for driving a control cable of a derailleur and for driving a brake cable of a brake of a bicycle, comprising:

a support body connectable at one side to a handlebar and having a part, projecting from said side, that can be gripped by a cyclist's hand;

a cable-winding bush about which said control cable of the derailleur is wound/unwound;

a first lever rotatable with respect to said support body about a first axis for actuating said brake cable and rotatable about a second axis for driving said cable-winding bush into rotation in a first direction of rotation;

an indexing mechanism connected to said first lever and cooperating with said cable-winding bush to define predetermined angular positions for said cable-winding bush; and, a transmission mechanism, arranged between said indexing mechanism and said cable-winding bush, that comprises a sliding connection which allows the displacement of said indexing mechanism with respect to said cable-winding bush and rotation of said indexing mechanism about said first axis;

wherein said support body comprises a recess for the passage of said control cable of the derailleur.

37. Integrated control device for driving a control cable of a derailleur and for driving a brake cable of a brake of a bicycle, comprising:

a support body connectable at one side to a handlebar and having a part, projecting from said side, that can be gripped by a cyclist's hand;

a cable-winding bush about which said control cable of the derailleur is wound/unwound;

a first lever rotatable with respect to said support body about a first axis for actuating said brake cable and rotatable about a second axis for driving said cable-winding bush into rotation in a first direction of rotation;

an indexing mechanism connected to said first lever and cooperating with said cable-winding bush to define predetermined angular positions for said cable-winding bush; and, a transmission mechanism, arranged between said indexing mechanism and said cable-winding bush, that comprises a sliding connection with at least one slot that slidably receives a projecting element associated with said cable-winding bush or with said indexing mechanism and allows the displacement of said indexing mechanism with respect to said cable-winding bush;

wherein said support body comprises a recess for the passage of said control cable of the derailleur.

38. Integrated control device for driving a control cable of a derailleur and for driving a brake cable of a brake of a bicycle, comprising:

a support body connectable to handlebars;

a support element hingedly connected to the support body for driving the brake cable;

a cable-winding bush, located within the support body connectable to handlebars, rotatable about a rotational axis for winding/unwinding said control cable of the derailleur about said rotational axis, the rotational axis being fixed in relation to the support body connectable to handlebars;

an indexing mechanism cooperating with said cable-winding bush to define predetermined angular positions for said cable-winding bush, said indexing mechanism being completely mounted on the support element; and a transmission mechanism comprising an intermediate shaft, a first cardan joint, and a second cardan joint, said first cardan joint connecting said intermediate shaft to said indexing mechanism, and said second cardan joint connecting said intermediate shaft to said cable-winding bush.

39. Integrated control device for driving a control cable of a derailleur and for driving a brake cable of a brake of a bicycle, comprising:

a support body connectable at one side to a handlebar and having a part, projecting from said side, that is configured to be gripped by a cyclist's hand;

a cable-winding bush about which said control cable of the derailleur is wound/unwound;

a first lever rotatable with respect to said support body about a first axis for actuating said brake cable and rotatable about a second axis for driving said cable-winding bush into rotation in a first direction of rotation;

an indexing mechanism connected to said first lever and cooperating with said cable-winding bush to define predetermined angular positions for said cable-winding bush; and a transmission mechanism with a sliding connection positioned between said indexing mechanism and said cable-winding bush that allows for displacement of said indexing mechanism with respect to said cable-winding bush, said sliding connection including at least one slot that slidably receives a projecting element associated with said cable-winding bush or with said indexing mechanism;

wherein said support body comprises a recess for the passage of said control cable of the derailleur.

* * * * *